Patented July 27, 1926.

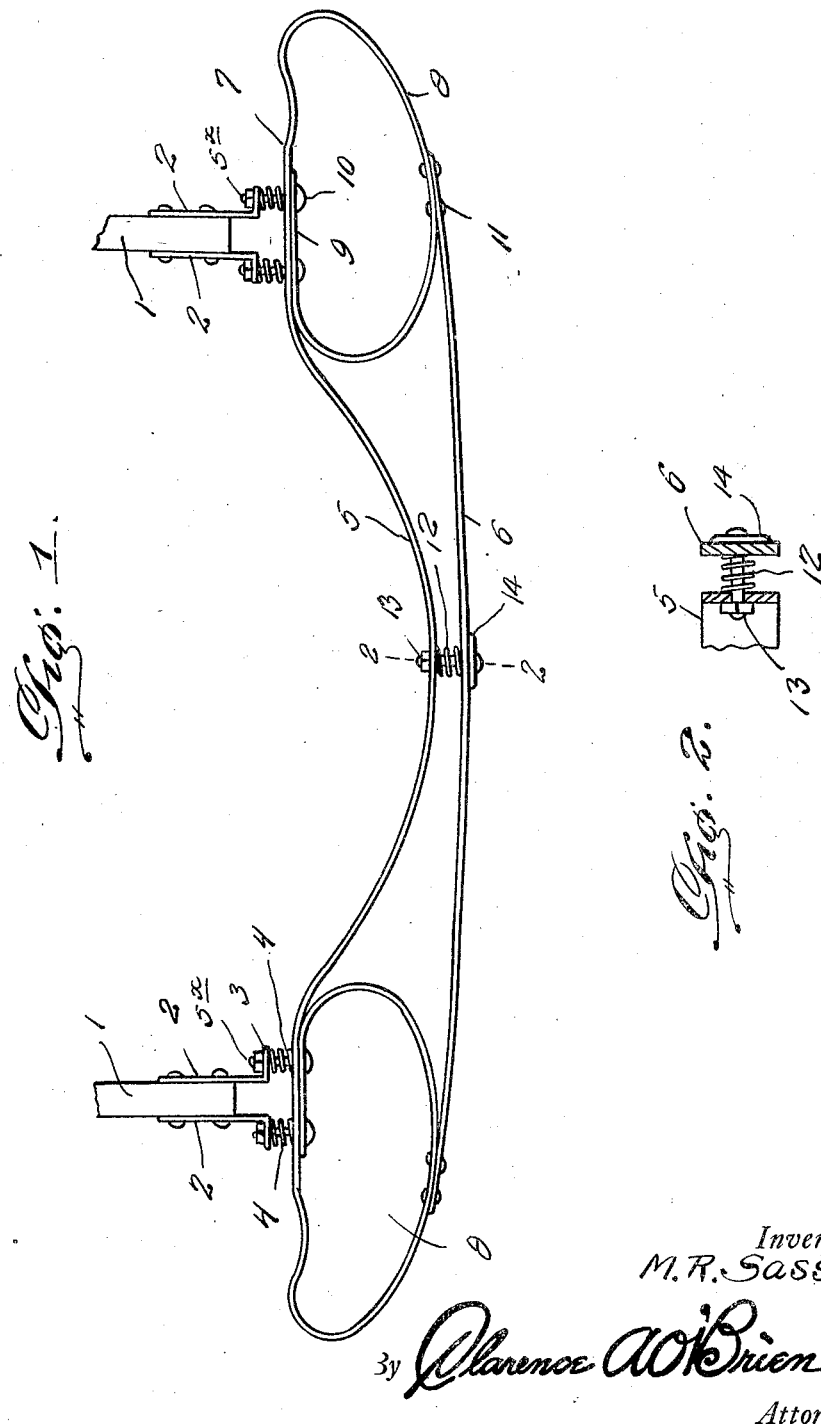

1,593,675

UNITED STATES PATENT OFFICE.

MAURICE ROBERT SASSO, OF BROOKLYN, NEW YORK.

AUTOMOBILE BUMPER.

Application filed March 6, 1926. Serial No. 92,840.

My present invention has to do with bumpers for use at the front and rear of automobiles, and it has for its general object the provision of an automobile bumper of simple and inexpensive construction and great shock absorbing capacity, and one which, in general, is strong and durable and therefore well adapted to withstand the usuage to which automobile bumpers are ordinarily subjected.

Other objects and practical advantages of the invention will be fully understood from the following description and claim when the same are read in connection with the drawings, accompanying and forming part of this specification, in which:—

Figure 1 is a plan view illustrative of a bumper constructed in accordance with my invention.

Figure 2 is an enlarged fragmentary cross section taken in the plane indicated by the line 2—2 of Figure 1.

Similar numerals of reference designate corresponding parts in both views of the drawings.

I show in Figure 1 two projecting portions 1 at the end of an automobile, which portions 1, may, within the purview of my invention, be any appropriate parts at the end of an automobile.

My novel bumper is attached to the said portions 1, and in the preferred embodiment of my invention the portions referred to are equipped with brackets 2 fixed with respect to the portions 1 and having lateral apertured arms 3. The improved bumper is arranged in opposed relation to the said arms 3 of the brackets 2 and cushioning or shock absorbing springs 4 are interposed between said arms 3 and the adjacent portion of the bumper so as to contribute to the cushioning or shock absorbing quality of the bumper. As illustrated the springs 4 are supported by bolts 5 which extend through the arms 3 and serve for the attachment of the bumper to the said arms 3.

My novel bumper is characterized by a major member 5, and a minor member 6, the said member 6 being in the form of an outer bar hereinafter explicitly alluded to. The member 5 is formed in one piece of steel or other metal possessed of the requisite resiliency, and its intermediate portion is concavo-convex in the direction of its length and with its convex side remote from the automobile. The said concavo-convex intermediate portion is merged at its ends into end portions 7 and the said end portions 7, in turn, are merged into loops 8 the terminal portions 9 of which are lapped against the end portions 7 and are riveted or otherwise connected at 10 thereto, it being noted in this connection that when deemed expedient the bolts 5× may be used in the connection of the loop terminals 9 to the end portions 7 of the member 5. The member or bar 6 is riveted or otherwise connected at 11 to the outer portions of the loops 8 so as to tie the said loops 8 together and in that way contribute to the general strength and durability of the bumper. Again it will be understood that the member or bar 6 is designed to receive any blows that may be imposed on the bumper at points intermediate of the loops 8. Largely for this reason a coiled cushioning spring 12 is interposed between the member or bar 6 and the concavo-convex portion of the member 5, the said spring 12 being mounted on and supported by a bolt 13 the head of which is opposed to a reinforcing plate 14, preferably employed at the outer side of the member 6.

It will be apparent from the foregoing that the loops 8 at the ends of the bumper contribute materially to the shock absorbing capacity of the bumper at the ends thereof, and that the intermediate concavo-convex portion of the member 5 in combination with the member 6 and the interposed spring 12 render the portion of the bumper between the loops 8 capable of absorbing considerable shock and jar.

It will be apparent from the foregoing that nothwithstanding the practical advantages ascribed to my novel bumper, the bumper is light in weight and is therefore not liable to contribute in appreciable degree to the weight of an automobile.

It will also be apparent that the novel bumper is calculated to protect the front and rear portions of the automobile against injury as well as to prevent the transmission of shock and jar incident to a collision to the occupants of the automobile.

I have specifically described the illustrated and preferred embodiment of my invention in order to impart an exact understanding of said embodiment in all of its details. I do not desire, however, to be understood as limiting myself to the precise construction disclosed, my invention being defined by my appended claim within the scope of which modifications may be made without departure from my invention.

Having described my invention, what I claim and desire to secure by Letters-Patent, is:—

In combination, automobile portions, a bumper having loops spaced outwardly and beyond said automobile portions, springs interposed between the automobile portions and the loops, a bumper portion of outwardly bowed form interposed between and connecting the inner sides of the said loops, a bar connected with and extending between the outer sides of the said loops, and a spring interposed between and connected with the outwardly bowed portion and the said bar.

In testimony whereof I affix my signature.

MAURICE ROBERT SASSO.